April 5, 1955
A. SKROBISCH
2,705,763
SYNCHRONOUS BRAKE MOTOR
Filed May 29, 1952
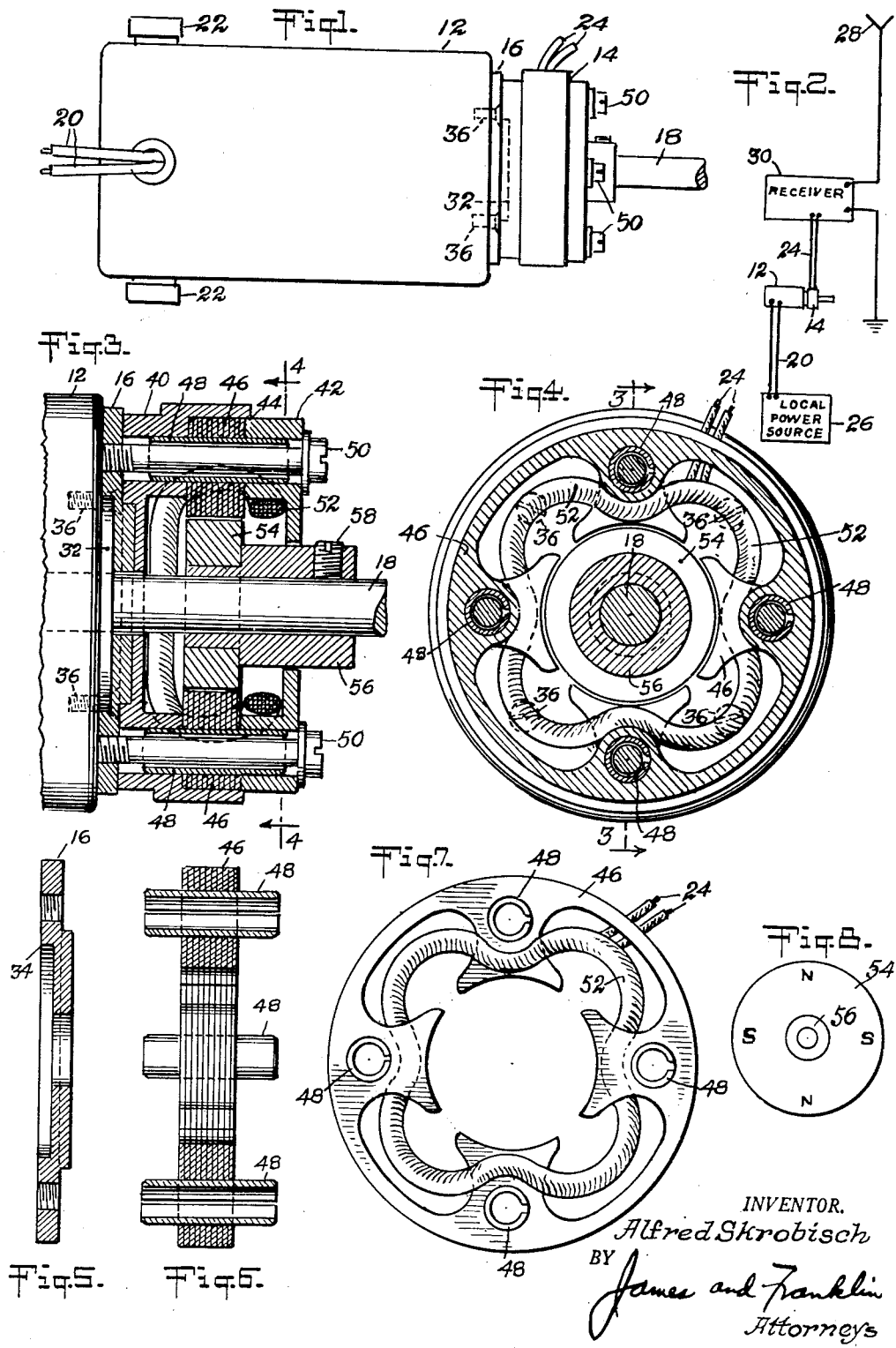
INVENTOR.
Alfred Skrobisch
BY
James and Franklin
Attorneys

United States Patent Office 2,705,763
Patented Apr. 5, 1955

2,705,763
SYNCHRONOUS BRAKE MOTOR

Alfred Skrobisch, New York, N. Y., assignor to Allard Instrument Corp., New York, N. Y., a corporation of New York Application May 29, 1952, Serial No. 290,633

9 Claims. (Cl. 310—112)

This invention relates to motors, especially those intended for synchronous operation, and more particularly to an accessory for use with a non-synchronous motor to cause it to operate at a synchronous speed.

For certain purposes the operation of a motor may be required to be in synchronism with the frequency of modulation of radio carrier. The received energy of this frequency is small and must be greatly amplified after detection in order to drive even a very small motor, say $\frac{1}{100}$ H. P. Motors of this small size are inefficient, and thus if an output of 5 watts is required, the motor input may have to be, say, 20 watts, and this greatly increases the size of the necessary amplifier equipment and the power supply for the same. In many fields, for example air-borne equipment, it is important to minimize the size of the needed amplifier equipment.

One primary object of the present invention is to generally improve apparatus intended to operate under the foregoing conditions and to meet the foregoing requirements. In accordance with a feature and object of the present invention, I provide a non-synchronous motor designed to operate from an available power supply at approximately synchronous speed under the average anticipated load. I call this motor the "host motor." I further provide an accessory synchronous motor connected to the non-synchronous motor for operation in unison therewith. This motor may have a capacity which is only a fraction of that of the main motor, but which capacity is large enough to hold the non-synchronous motor in synchronous operation over the anticipated range of variation in conditions, such as supply frequency and motor load.

This accessory motor may be called a "synchronous governor" or a "synchronous brake motor" because it acts sometimes as a brake and sometimes as a motor. It absorbs energy when the host motor attempts to run too fast, and it adds energy when the host motor attempts to slow down, relative to the frequency of the carrier-borne energy. From a slightly different viewpoint, it speeds up or slows down the host motor in response to changes in frequency of the carrier-borne energy relative to the normal speed of the host motor for its particular load. Thus the design requirements may call for a variation of plus or minus 5% or perhaps 10% in the carrier-borne frequency, and the size of the synchronous brake motor is selected relative to the size of the host motor to provide this required range of control.

For example, if a motor output of 5 watts is needed, with a control frequency range of plus or minus 10% (or a range of 20% in all), the output of the synchronous brake motor may need be only 1 watt. This motor, with an efficiency of say 25%, would require an amplifier output of only 4 watts, in contrast with the amplifier output of 20 watts needed if the synchronous motor were a 5 watt motor.

Further objects of the present invention are to provide a simplified and compact structure for the synchronous brake motor. The synchronous brake motor may be secured directly at one end of the host motor, and may be devoid of bearings, the rotor being carried by the motor shaft, and the bearings of the motor acting as the sole bearings for both the host motor and the accessory motor. The motor shaft passes through the rotor of the accessory, and the latter is so compact in axial dimension that the shaft may additionally project for connection to the load. In accordance with a further feature and object of the invention I provide an adapter plate between the host motor and the accessory, said adapter plate being dimensioned and shaped to mate with the end of the host motor, and being provided with holes to receive screws which anyway form a part of the host motor. It is further provided with threaded holes which receive the inner ends of assembly bolts passing through the stator of the accessory, thereby securing the stator to the adapter plate and thus to the host motor.

In accordance wih further features and objects of the invention the stator comprises non-ferrous housing members fitted together with ferrous laminations therebetween, these parts all being aligned in proper registration by means of hollow resilient cylinders. The assembly screws pass through the hollow cylinders and are threadedy received in the adapter plate. The rotor is a simple cylindrical body of permanently magnetizable material, appropriately magnetized to provide it with north and south poles.

To accomplish the foregoing objects, and other more specific objects which will hereinafter appear, my invention resides in the synchronous brake motor elements, and their relation one to another, as are hereinafter more particularly described in the following specification. The specification is accompanied by drawings, in which:

Fig. 1 shows the assembly of a host motor and synchronous brake motor;

Fig. 2 is a schematic diagram explanatory of the operation of the combined motors;

Fig. 3 is a section through the synchronous brake motor;

Fig. 4 is a transverse section taken approximately in the plane of the line 4—4 of Fig. 3;

Fig. 5 is a section through the adapter plate;

Fig. 6 is a section through the laminations;

Fig. 7 is a front elevation of the laminations; and

Fig. 8 shows the magnetization of the rotor.

Referring to the drawings, and more particularly to Fig. 1, I there show a host motor 12 with a synchronous brake motor 14 secured at one end of the host motor with the aid of an adapter plate 16 disposed therebetween. The regular motor shaft 18 passes through the synchronous brake motor 14, which is compact in axial dimension and leaves enough of shaft 18 projecting therebeyond for connection to the load. The host motor 12 is energized from a suitable power supply source through conductors 20. In the present case it is a commutator type motor, the brush holders of which are indicated at 22. The synchronous brake motor 14 is energized through conductors 24. In the particular case here illustrated the motor is a small motor, the host motor 12 having a diameter of say 2" and an output of say 5 watts.

The speed of the motor may be controlled by feeble energy, for example energy transmitted on a radio carrier. This is schematically illustrated in Fig. 2 in which it will be seen that the host motor 12 is energized through conductors 20 from a suitable local power source 26, which may be a battery, for example. The radio carrier-borne energy is received on an antenna 28 and supplied to a receiver 30 which detects and amplifies the synchronizing energy, the amplified energy being supplied through conductors 24 to the synchronous brake motor 14.

Referring now to Figs. 3 through 7, the adapter plate 16 (Fig. 5) is designed to mate with the end of the particular standard motor with which the synchronous brake motor is to be used. As here illustrated the standard motor 12 has a slightly projecting boss 32 (Fig. 3) and the adapter plate 16 is accordingly recessed, as indicated at 34 in Fig. 5, to receive the boss 32 and to help center the adapter plate with respect to the motor. The motor usually has a ring of assembly screws or end-bell securing screws. There are usually four such screws, here indicated in dotted lines at 36 in Figs. 3 and 4. The adapter plate is provided with holes registering with these screws, and the same screws, or corresponding screws slightly greater in length, are employed to securely anchor the adapter plate to the end of the motor.

The accessory motor comprises a stator and a rotor, but requires no bearings. The stator includes a housing made up of two non-ferrous castings 40 and 42 (Fig. 3) which are dimensioned to come together with an interlocking or telescopic fit, as indicated at 44. A stack of ferrous or ferromagnetic laminations 46 is received between the housing members 40 and 42. The housing members and the laminations are provided with registering holes dimensioned to receive hollow pins 48, known commercially as "roll pins." These are hollow, cylindrical, longitudinally split members which are capable of some resilient contraction and expansion, and which are therefore ideally suited to hold all of the parts in registration with a drive fit. Moreover, the assembly of the stator may be completed by a ring of screws 50 dimensioned to pass freely through the roll pins 48. The adapter plate 16 has threaded holes to receive the ends of the screws 50, and it will be evident from inspection of Fig. 3 that by tightening the screws 50 the entire stator is secured tightly against the adapter plate 16, which in turn has already been secured tightly against the end of the housing of the host motor 12 by means of the screws 36.

The field winding of the stator is indicated at 52, and the laminations 46 are shaped to provide four poles, as shown in Figs. 4 and 7. In the present case the winding is a single large winding which is then bent to pass around the poles, the winding passing over two diametrically opposite poles, and beneath the alternate two poles. This is shown in the drawing and is one of the commonly known forms of winding, and therefore requires no further detailed description.

The rotor in this case is a cylindrical body of permanently magnetizable material shown at 54 in Figs. 3, 4, and 8. In some cases it may be preferred to use a salient pole rotor. The rotor is carried by a sleeve 56, the said sleeve being dimensioned to receive the shaft 18 of the host motor. In most small motors of the kind here disclosed the shaft diameter is ¼", but it will be understood that if the particular motor being used has a shaft of different diameter the sleeve 56 must be modified to compensate for that difference in diameter. In such case both the adapter plate 16 and the sleeve 56 will require adaptation to the motor, but in most cases it is only the plate 16 that would have to be adapted, the shaft size being usually standard. The sleeve 56 may be provided with one or more set screws, as indicated at 58 in Fig. 3, to lock the sleeve rotor to the shaft.

The rotor is magnetized to provide the same with north and south poles. This is schematically indicated in Fig. 8, showing the use of diametrically opposed north and south poles to provide a four pole rotor.

It will be seen that the synchronous brake motor is devoid of bearings, and that the bearings of the host motor 12 act as the sole means to support the rotor 54 of the accessory motor. This is important because there is a great saving in the cost of manufacture of the synchronous brake motor, and because it would be difficult to accurately align additional bearings with the two bearings of the host motor. Moreover, it minimizes the axial dimension of the synchronous brake motor, thus making it feasible to use the remaining projection of the regular motor shaft for connection to the load of the motor.

In operation, the host motor is selected to drive the load at a speed approximately that desired, that is, the speed based on an A. C. frequency to be supplied. Energy of this desired frequency is fed into the windings of the synchronous brake motor, and causes the rotor to lock into step with the rotating field set up in the brake windings. The synchronizing torque of the rotor is sufficient to hold the host motor at synchronous speed despite variations in load, or applied frequency, or voltage applied to the host motor itself. This control can be obtained at a considerable saving in A. C. synchronous frequency power because most of the driving torque is supplied by the host motor, and the synchronous brake motor has to supply merely the differential power needed to smooth out variations and hold the speed synchronous. At times, therefore, the rotor acts as a brake, and at other times when the load increases or the voltage to the host motor drops, the rotor acts as a motor, supplying power to the load.

While the rotor can be a reluctance type, with salient poles of iron or steel, such a rotor would be less efficient than the permanent magnet type, and would not be "phase sensitive," that is, it would not always lock in synchronism with the stator field in the same phase relationship, something which a magnetized rotor will always do. This characteristic is of considerable value in many instrument applications.

The synchronous brake motor as shown cannot start itself, or bring itself up to speed. In the form shown it is purely a synchronizing device, and depends on the host motor to bring it to nearly the desired speed.

The housing members are profreeably made of aluminum, although other materials may be used. The rotor may be slotted, or provided with salient poles, although the present illustration uses the cylindrical structure shown. The material of the rotor is preferably Alnico, and is permanently magnetized by processes already known, to form the equivalent of poles, as is indicated in Fig. 8 of the drawing. The laminations are preferably made of iron.

The synchronous brake motor shown is a single phase motor, but it can also be a split single phase motor, with the aid of a capacitive circuit to split the phase, and in such case the field or stator is provided with two windings. Theoretically the synchronous brake motor might be a multiple phase motor, but in practice this is not likely. The synchronous brake motor may be made with a greater number or lesser number of poles than the four shown. For example, if it were provided with twelve teeth it might be so wound as to provide synchronous operation based on two poles, four poles, or six poles. The stator winding may consist of individual windings disposed around each pole, instead of the folded coil winding shown.

It is believed that the construction, operation, and method of use of my synchronous brake motor, as well as the advantages thereof, will be apparent from the foregoing detailed description. It will also be apparent that while I have shown and described the invention in a preferred form, changes may be made in the structure shown without departing from the scope of the invention, as sought to be defined in the following claims.

I claim:

1. An accessory synchronous brake motor intended for use with a main standard motor, said accessory motor comprising a housing including two non-ferrous castings dimensioned to come together with a telescopic fit, a stack of ferrous pole laminations received between said castings, a plurality of registering holes through said castings and laminations, roll pins tightly received in said holes to hold said parts in registration and against separation, said castings enclosing and housing said laminations, and a field winding disposed about the poles of said laminations.

2. An accessory synchronous brake motor for use with a main standard motor having end-bell securing screws at one end and having bearings at each end, said accessory motor comprising an adapter plate adapted to be received between the main motor and the accessory motor, said accessory motor comprising a stator including a housing made up of two non-ferrous castings dimensioned to come together with a telescopic fit, a stack of ferrous pole laminations received between said castings, a plurality of registering holes through said castings and laminations, roll pins tightly received in said holes to hold said parts in registration and against separation, said castings enclosing and housing said laminations, threaded bolts dimensioned to pass freely through said roll pins and into mating threaded holes in the adapter plate, said adapter plate having holes to receive screws dimensioned to replace the screws normally used at the end of the main motor.

3. An accessory synchronous brake motor for use outside a main standard motor having end-bell securing screws at one end and having bearings at each end supporting a shaft which projects outwardly beyond the motor, said accessory motor comprising an adapter plate adapted to be received between the main motor and the accessory motor, said accessory motor comprising a stator including a housing made up of two non-ferrous castings dimensioned to come together with a telescopic fit, a stack of ferrous pole laminations received between said castings, said castings enclosing and housing said laminations, a plurality of registering holes through said castings and laminations, threaded bolts dimensioned to pass freely through said holes and into mating threaded holes in the adapter plate, said adapter plate having holes to receive screws dimensioned to replace the end-bell securing screws normally used at the end of the main motor, a field winding disposed about the poles of said laminations, and a rotor having a sleeve dimensioned to receive the outwardly projecting shaft of the main motor, the accessory motor being devoid of bearings, and the bearings of the main motor acting as the sole means to support the rotor of the accessory motor.

4. An accessory synchronous brake motor for use outside a main standard motor having end-bell securing screws at one end and having bearings at each end supporting a shaft which projects outwardly beyond the motor, said accessory motor comprising an adapter plate adapted to be received between the main motor and the accessory motor, said accessory motor comprising a stator including a housing made up of two non-ferrous castings dimensioned to come together with a telescopic fit, a stack of ferrous pole laminations received between said castings, a plurality of registering holes through said castings and laminations, roll pins tightly received in said holes to hold said parts in registration and against separation, said castings enclosing and housing said laminations, threaded bolts dimensioned to pass freely through said roll pins and into mating threaded holes in the adapter plate, said adapter plate having holes to receive screws dimensioned to replace the end-bell securing screws normally used at the end of the main motor, a field winding disposed about the poles of said laminations, and a rotor having a sleeve dimensioned to receive the outwardly projecting shaft of the main motor, the accessory motor being devoid of bearings, and the bearings of the main motor acting as the sole means to support the rotor of the accessory motor.

5. An accessory synchronous brake motor for use outside a main standard motor having end-bell securing screws at one end and having bearings at each end supporting a shaft which projects outwardly beyond the motor, said accessory motor comprising an adapter plate adapted to be received between the main motor and the accessory motor, said accessory motor comprising a stator, threaded bolts dimensioned to pass through said stator and into mating threaded holes in the adapter plate, said adapter plate having holes to receive screws dimensioned to replace the end-bell securing screws normally used at the end of the main motor, and a rotor comprising a cylindrical body of permanently magnetizable material, said body being magnetized to provide the same with north and south poles despite its cylindrical configuration, said rotor having a sleeve dimensioned to receive the outwardly projecting shaft of the main motor, the accessory motor being devoid of bearings, and the bearings of the main motor acting as the sole means to support the rotor of the accessory motor.

6. An accessory synchronous brake motor for use outside a main standard motor having end-bell securing screws at one end and having bearings at each end supporting a shaft which projects outwardly beyond the motor, said accesory motor comprising an adapter plate adapted to be received between the main motor and the accessory motor, said accessory motor comprising a stator including a housing made up of two non-ferrous castings dimensioned to come together with a telescopic fit, a stack of ferrous pole laminations received between said castings, a plurality of registering holes through said castings and laminations, roll pins tightly received in said holes to hold said parts in registration and against separation, said castings enclosing and housing said laminations, threaded bolts dimensioned to pass freely through said roll pins and into mating threaded holes in the adapter plate, said adapter plate having holes to receive screws dimensioned to replace the end-bell securing screws normally used at the end of the main motor, a field winding disposed about the poles of said laminations, and a rotor comprising a cylindrical body of permanently magnetizable material, said body being magnetized to provide the same with north and south poles despite its cylindrical configuration, said rotor having a sleeve dimensioned to receive the outwardly projecting shaft of the main motor, the accessory motor being devoid of bearings, and the bearings of the main motor acting as the sole means to support the rotor of the accessory motor.

7. An accessory synchronous brake motor for use outside a main standard motor having end-bell securing screws at one end and having bearings at each end supporting a shaft which projects outwardly beyond the motor, said accessory motor comprising an adapter plate adapted to be received between the main motor and the accessory motor, a stator including laminations and a field winding, means mounting the same on the adapter plate, said adapter plate having holes to receive screws dimensioned to replace the end-bell securing screws normally used at the end of the main motor, and a rotor having a sleeve dimensioned to receive the outwardly projecting shaft of the main motor, the accessory motor being devoid of bearings, and the bearings of the main motor acting as the sole means to support the rotor of the accessory motor.

8. An accessory synchronous brake motor for use outside a main standard motor having end-bell securing screws at one end and having bearings at each end supporting a shaft which projects outwardly beyond the motor, said accessory motor comprising an adapter plate adapted to be received between the main motor and the accessory motor, a stator including a housing made up of two non-ferrous castings, a stack of ferrous pole laminations received between said castings, a plurality of registering holes through said castings and laminations, threaded bolts dimensioned to pass freely through said holes and into mating threaded holes in the adapter plate, said adapter plate having holes to receive screws dimensioned to replace the end-bell securing screws normally used at the end of the main motor, a field winding disposed about the poles of said laminations, and a rotor having a sleeve dimensioned to receive the outwardly projecting shaft of the main motor, the accessory motor being devoid of bearings, and the bearings of the main motor acting as the sole means to support the rotor of the accessory motor.

9. An accessory synchronous brake motor for use outside a main standard motor having end-bell securing screws at one end and having bearings at each end supporting a shaft which projects outwardly beyond the motor, said accessory motor comprising a stator including a housing made up of two non-ferrous castings dimensioned to come together with a telescopic fit, a stack of ferrous pole laminations received between said castings, said castings enclosing and housing said laminations, means including screws dimensioned to replace the end-bell securing screws normally used at the end of the main motor to mount the stator on the main motor, a field winding disposed about the poles of said laminations, and a rotor having a sleeve dimensioned to receive the outwardly projecting shaft of the main motor, the accessory motor being devoid of bearings, and the bearings of the main motor acting as the sole means to support the rotor of the accessory motor.

References Cited in the file of this patent

UNITED STATES PATENTS

| | | |
|---|---|---|
| 1,102,116 | Wood | June 30, 1914 |
| 1,424,164 | Hoover | Aug. 1, 1922 |
| 1,477,271 | Lowenstein | Dec. 11, 1923 |
| 1,730,772 | Karolus | Oct. 8, 1929 |
| 1,822,859 | Perkins | Sept. 8, 1931 |
| 1,971,968 | Schmitter | Aug. 28, 1934 |
| 2,101,665 | Arey | Dec. 7, 1937 |
| 2,131,436 | Howell | Sept. 27, 1938 |
| 2,202,172 | Stoller | May 28, 1940 |
| 2,416,341 | Morrison | Feb. 25, 1947 |
| 2,460,063 | Cole | Jan. 25, 1949 |

FOREIGN PATENTS

| | | |
|---|---|---|
| 732,014 | France | June 6, 1932 |
| 918,829 | France | Nov. 4, 1946 |